(12) United States Patent
Kim et al.

(10) Patent No.: US 7,924,943 B2
(45) Date of Patent: Apr. 12, 2011

(54) METHOD AND SYSTEM FOR OPTIONAL CLOSED LOOP MECHANISM WITH ADAPTIVE MODULATIONS FOR MULTIPLE INPUT MULTIPLE OUTPUT (MIMO) WIRELESS LOCAL AREA NETWORK (WLAN) SYSTEM

(75) Inventors: Joonsuk Kim, San Jose, CA (US); Carlos H. Aldana, Mountain View, CA (US); Christopher J. Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1481 days.

(21) Appl. No.: 11/110,241

(22) Filed: Apr. 20, 2005

(65) Prior Publication Data

US 2006/0176972 A1 Aug. 10, 2006

Related U.S. Application Data

(60) Provisional application No. 60/650,941, filed on Feb. 7, 2005.

(51) Int. Cl.
*H04L 27/00* (2006.01)

(52) U.S. Cl. ........ 375/299; 375/219; 375/316; 375/377; 455/25

(58) Field of Classification Search .................. 375/133, 375/130, 132, 299, 295, 219–221, 296, 316, 375/377; 700/1, 28, 53; 343/757; 455/7, 455/25; 434/757

See application file for complete search history.

(56) References Cited

U.S. PATENT DOCUMENTS

| | | | | |
|---|---|---|---|---|
| 3,855,423 A * | 12/1974 | Brendzel et al. | ............... | 708/323 |
| 5,070,536 A | 12/1991 | Mahany et al. | | |
| 5,425,051 A | 6/1995 | Mahany | | |
| 2003/0003863 A1* | 1/2003 | Thielecke et al. | ............... | 455/39 |
| 2004/0151145 A1* | 8/2004 | Hammerschmidt | .......... | 370/338 |
| 2005/0152473 A1* | 7/2005 | Maltsev et al. | ............... | 375/299 |
| 2005/0237992 A1* | 10/2005 | Mishra et al. | ................. | 370/349 |
| 2007/0054632 A1* | 3/2007 | Lu et al. | ........................ | 455/101 |

OTHER PUBLICATIONS

Christopher J. Hansen, IEEE 802.11 Wireless LANs WWiSE Proposal: High Throughput Extension to the 802.11 Standard, Dec. 20, 2004.

Syed Aon Mujtaba, IEEE 802.11 Wireless LANs TGn Sync Proposal Technical Specification, Jan. 18, 2005.

* cited by examiner

*Primary Examiner* — David C Payne
*Assistant Examiner* — James M Perez
(74) *Attorney, Agent, or Firm* — McAndrews, Held & Malloy, Ltd.

(57) ABSTRACT

Aspects of a method and system for an optional closed loop mechanism with adaptive modulations for a multiple input multiple output (MIMO) WLAN system are provided. One aspect of the system may comprise a receiver that may select, for a plurality of spatial streams, a modulation type and/or coding rate. The receiver may communicate a message, via an RF channel, that comprises a plurality of modulation types and/or coding rates. The receiver may configure for receiving subsequent data based on at least one selected modulation type and/or coding rate. Another aspect of the system may comprise a transmitter that may receive a message, via an RF channel, that comprises a specification of, for a plurality of spatial streams, a plurality of modulation types and/or coding rates. The system may configure for transmitting subsequent data based on at least one of the received modulation types and/or coding rates.

28 Claims, 10 Drawing Sheets

METHOD AND SYSTEM FOR OPTIONAL CLOSED LOOP MECHANISM WITH ADAPTIVE MODULATIONS FOR MULTIPLE INPUT MULTIPLE OUTPUT (MIMO) WIRELESS LOCAL AREA NETWORK (WLAN) SYSTEM

CROSS-REFERENCE TO RELATED APPLICATIONS/INCORPORATION BY REFERENCE

This application makes reference, claims priority to, and claims the benefit of U.S. Provisional Application Ser. No. 60/650,941 filed Feb. 7, 2005.

This application makes reference to:
U.S. patent application Ser. No. 11/061,567 filed Feb. 18, 2005;
U.S. patent application Ser. No. 11/052,389 filed Feb. 7, 2005; and
U.S. patent application Ser. No. 11/052,353 filed Feb. 7, 2005.

All of the above state applications are hereby incorporated herein by reference in their entirety.

FIELD OF THE INVENTION

Certain embodiments of the invention relate to wireless communication. More specifically, certain embodiments of the invention relate to a method and system for an optional closed loop mechanism with adaptive modulations for a multiple input multiple output (MIMO) wireless local area network (WLAN) system.

BACKGROUND OF THE INVENTION

The Institute for Electrical and Electronics Engineers (IEEE), in resolution IEEE 802.11, also referred as "802.11", has defined a plurality of specifications which are related to wireless networking. With current existing 802.11 standards, such as 802.11(a), (b), (g), which can support up to 54 Mbps data rates, either in 2.4 GHz or in 5 GHz frequency bands, the IEEE standards body created a new task group, 802.11n, to support higher than 100 Mbps data rates. Among them are being discussed specifications for "closed loop" feedback mechanisms by which a receiving station may feed back information to a transmitting station to assist the transmitting station in adapting signals, which are sent to the receiving station.

In closed loop feedback systems, a transmitting station may utilize feedback information from a receiving station to transmit subsequent signals in what is called "beamforming". Beamforming is a technique to steer signals to a certain direction for the receiver to receive it more reliably with less noise and interference. Compounded with demands for new features and capabilities, various proposals for new 802.11n based feedback mechanisms are emerging to address the demand for these new features and capabilities. For example, there exists a demand for the introduction of new capabilities, which may enable a receiving mobile terminal to feedback pertinent information to a transmitting mobile terminal. This feedback of pertinent information may enable the transmitting mobile terminal to adapt its mode of transmission based upon the feedback information provided by the receiving mobile terminal. As with any communication system, a major goal is to enable the transmitting mobile station to achieve a higher information transfer rate to the receiving mobile terminal, while simultaneously achieving a lower packet error rate (PER). Notwithstanding, there are no existing methodologies that adequately address these shortcomings and the demand for these new features and capabilities in WLANs.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for optional closed loop mechanism with adaptive modulations for a multiple input multiple output (MIMO) wireless local area network (WLAN) system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for an optional closed loop mechanism with adaptive modulations for a multiple input multiple output (MIMO) wireless local area network (WLAN) system, which utilizes a channel sounding mechanism to communicate information between a transmitter and a receiver.

Embodiments of the invention may utilize a new channel sounding mechanism in a closed loop system that enables adaptive modulation and beamforming. Modulation types and coding rates may be chosen adaptively per-stream based on ranges in the values of SNRs. The transmitter may choose modulation types and coding rates based on channel feedback information.

In accordance with an embodiment of the invention, with regard to channel information, MIMO systems may utilize the channel more efficiently based on observable criteria. In an example of observable criteria, RF channels that are characterized by higher signal to noise ratios (SNR) may support higher data transfer rates than RF channels with lower SNR. Eigenbeamforming, or "beamforming", may be utilized with systems that support the exchange of feedback information from a receiver to a transmitter (or "closed loop" systems) to "steer beams" which may enable signal energy to be focused in a desired direction. Any of a plurality of RF channels which may be utilized by a transmitter to communicate with a receiver may be referred to as "downlink channels", while any of a plurality of RF channels which may be utilized by a receiver to communicate with a transmitter may be referred to as "uplink channels".

Adaptive modulation and coding rate techniques may be utilized with beamforming techniques such that a plurality of signals, or "streams", may be transmitted simultaneously that comprise different amounts of data. The modulation and/or coding rate may be chosen per stream efficiently, with either or both capable of being modified, based on channel information.

In one aspect of the invention, an objective is to select modulation and/or coding schemes on a per-stream basis to maximize the aggregate information transfer rate while minimizing packet error rates (PER) for information transmitted simultaneously via a plurality of RF channels. This may entail evaluating the SNR performance of individual RF channels, and adapting the modulation and/or coding scheme for each RF channel based on SNR, and data rate maximization criteria. Exemplary measures of signal quality may comprise, for example, SNR and PER.

Figure 1:
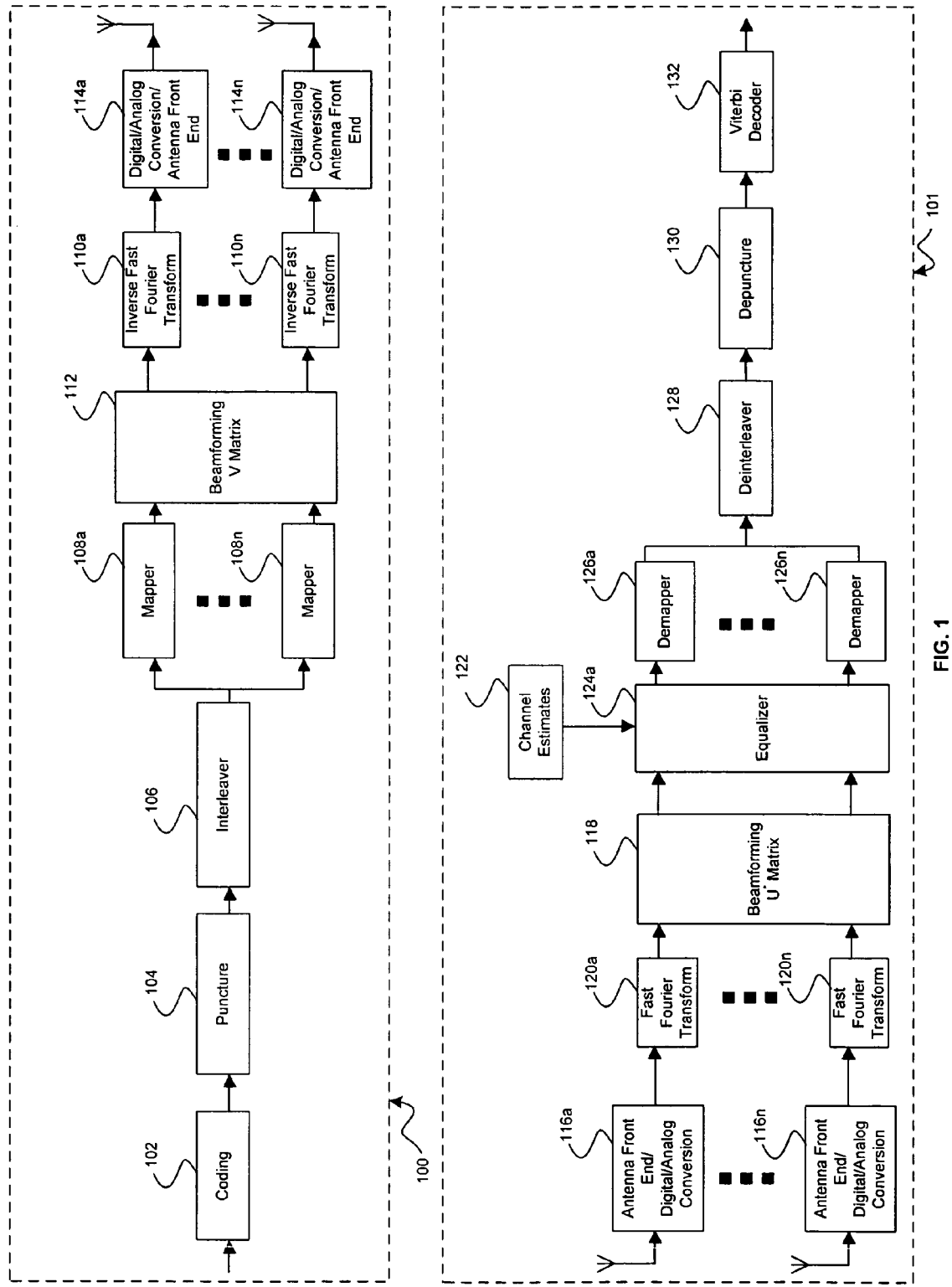
FIG. 1 is an exemplary block diagram of a transmitter and a receiver in a MIMO system, in accordance with an embodiment of the invention.

FIG. 1 is an exemplary block diagram of a transmitter and a receiver in a MIMO system, in accordance with an embodiment of the invention. With reference to FIG. 1 is shown a transmitter 100 and a receiver 101. The transmitter 100 may comprise a coding block 102, a puncture block 104, an interleaver block 106, a plurality of mapper blocks 108a . . . 108n, a plurality of inverse fast Fourier transform (IFFT) blocks 110a . . . 110n, a beamforming V matrix block 112, and a plurality of digital/analog (D/A) conversion/antenna front end blocks 114a . . . 114n. The receiver 101 may comprise a plurality of antenna front end/analog/digital (A/D) conversion blocks 116a . . . 116n, a beamforming U* matrix block 118, a plurality of fast Fourier transform (FFT) blocks 120a . . . 120n, a channel estimates block 122, an equalizer block 124, a plurality of demapper blocks 126a . . . 126n, a deinterleaver block 128, a depuncture block 130, and a Viterbi decoder block 132.

The variables V and U* in beamforming blocks 112 and 118 respectively refer to matrices utilized in the beamforming technique. U.S. application Ser. No. 11/052,389 filed Feb. 7, 2005, provides a detailed description of Eigenbeamforming and is hereby incorporated herein by reference in its entirety.

In the transmitter 100, the coding block 102 may transform received binary input data blocks by applying a forward error correction (FEC) technique, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in the binary input data block to the number of bits in the transformed data block may be known as the "coding rate". The coding rate may be specified using the notation $i_b/t_b$, where $t_b$ represents the total number of bits that comprise a coding group of bits, while $i_b$ represents the number of information bits that are contained in the group of bits $t_b$. Any number of bits $t_b-i_b$ may represent redundant bits that may enable the receiver 101 to detect and correct errors introduced during transmission. Increasing the number of redundant bits may enable greater capabilities at the receiver to detect and correct errors in information bits. The penalty for this additional error detection and correction capability may result in a reduction in the information transfer rates between the transmitter 100 and the receiver 101. The invention is not limited to BCC and a plurality of coding techniques, for example, Turbo coding, or low density parity check (LDPC) coding may also be utilized.

The puncture block 104 may receive transformed binary input data blocks from the coding block 102 and alter the coding rate by removing redundant bits from the received transformed binary input data blocks. For example, if the coding block 102 implemented a ½ coding rate, 4 bits of data received from the coding block 102 may comprise 2 information bits, and 2 redundant bits. By eliminating 1 of the redundant bits in the group of 4 bits, the puncture block 104 may adapt the coding rate from ½ to ⅔. The interleaver block 106 may rearrange bits received in a coding rate-adapted data block from the puncture block 104 prior to transmission via an RF channel to reduce the probability of uncorrectable corruption of data due to burst of errors, impacting contiguous bits, during transmission via an RF channel. The output from the interleaver block 106 may also be divided into a plurality of streams where each stream may comprise a non-overlapping portion of the bits from the received coding rate-adapted data block. Therefore, for a given number of bits in the coding rate-adapted data block, $b_{db}$, a given number of streams from the interleaver block 106, $n_{st}$, and a given number of bits assigned to an individual stream i by the interleaver block 106, $b_{st}(i)$:

$$b_{db} = \sum_{i=0}^{n_{st}-1} b_{st}(i) \qquad \text{equation[1]}$$

For a given number of coded bits before interleaving, $b_{db}$, each bit may be denoted by an index, k=0, 1 . . . $b_{db}$-1. The interleaver block 106 may assign bits to the first spatial stream, spatial stream 0, $b_{st}(0)$, for bit indexes k=0, $n_{st}$, $2*n_{st}$, . . . , $b_{db}-n_{st}$. The interleaver block 106 may assign bits to spatial stream 1, $b_{st}(1)$, for bit indexes k=1, $n_{st}+1$, $2*n_{st}+1$, . . . , $b_{db}-n_{st}+1$. The interleaver block 106 may assign bits to spatial stream 2, $b_{st}(2)$, for bit indexes k=2, $n_{st}+2$, $2*n_{st}+2$, . . . , $b_{db}-n_{st}+2$. The interleaver block 106 may assign bits to spatial stream $n_{st}$, $b_{st}(n_{st})$, for bit indexes k=$n_{st}-1$, $2*n_{st}-1$, $3*n_{st}-1$, . . . , $b_{db}-1$.

The plurality of mapper blocks 108a . . . 108n may comprise a number of individual mapper blocks that is equal to the number of individual streams generated by the interleaver block 106. Each individual mapper block 108a . . . 108n may receive a plurality of bits from a corresponding individual stream, mapping those bits into a "symbol" by applying a modulation technique based on a "constellation" utilized to transform the plurality of bits into a signal level representing the symbol. The representation of the symbol may be a complex quantity comprising in-phase (I) and quadrature (Q) components. The mapper block 108a . . . 108n for stream i may utilize a modulation technique to map a plurality of bits, $b_{st}(i)$, into a symbol.

The beamforming V matrix block 112 may apply the beamforming technique to the plurality of symbols, or "spatial modes", generated from the plurality of mapper blocks 108a . . . 108n. The beamforming V matrix block 112 may generate a plurality of signals where the number of signals generated may be equal to the number of transmitting antenna at the transmitter 100. Each signal in the plurality of signals generated by the beamforming V block 112 may comprise a weighted sum of at least one of the received symbols from the mapper blocks 108a . . . 108n.

The plurality of IFFT blocks 110a . . . 110n may receive a plurality of signals from the beamforming block 112. Each IFFT block 110a . . . 110n may subdivide the bandwidth of the RF channel into a plurality of n sub-band frequencies to implement orthogonal frequency division multiplexing (OFDM), buffering a plurality of received signals equal to the number of sub-bands. Each buffered signal may be modulated by a carrier signal whose frequency is based on that of one of the sub-bands. Each of the IFFT blocks 110a . . . 110n may then independently sum their respective buffered and modulated signals across the frequency sub-bands to perform an n-point IFFT thereby generating a composite OFDM signal.

The plurality of digital (D) to analog (A) conversion and antenna front end blocks 114a . . . 114n may receive the plurality of signals generated by the plurality of IFFT blocks 110a . . . 110n. The digital signal representation received from each of the plurality of IFFT blocks 110a . . . 110n may be converted to an analog RF signal that may be amplified and transmitted via an antenna. The plurality of D to A conversion and antenna front end blocks 114a . . . 114n may be equal to the number of transmitting antenna at the transmitter 100. Each D to A conversion and antenna front end block 114a . . . 114n may receive one of the plurality of signals from the beamforming V matrix block 112 and may utilize an antenna to transmit one RF signal via an RF channel.

In the receiver 101, the plurality of antenna front end and A to D conversion blocks 116a . . . 116n may receive analog RF signals via an antenna, converting the RF signal to baseband and generating a digital equivalent of the received analog baseband signal. The digital representation may be a complex quantity comprising I and Q components. The number of antenna front end and A to D conversion blocks 116a . . . 116n may be equal to the number of receiving antenna at the receiver 101.

The plurality of FFT blocks 120a . . . 120n may receive a plurality of signals from the plurality of antenna front end and A to D conversion blocks 116a . . . 116n. The plurality of FFT blocks 120a . . . 120n may be equal to the number of antenna front end and A to D conversion blocks 116a . . . 116n. Each FFT block 120a . . . 120n may receive a signal from an antenna front end and A to D conversion block 116a . . . 116n, independently applying an n-point FFT technique, and demodulating the signal by a utilizing a plurality of carrier signals based on the n sub-band frequencies utilized in the transmitter 100. The demodulated signals may be mathematically integrated over one sub band frequency period by each of the plurality of FFT blocks 120a . . . 120n to extract n symbols contained in each of the plurality of OFDM signals received by the receiver 101.

The beamforming U* block 118 may apply the beamforming technique to the plurality of signals received from the plurality of FFT blocks 120a . . . 120n. The beamforming U* block 118 may generate a plurality of signals where the number of signals generated may be equal to the number of spatial streams utilized in generating the signals at the transmitter 100. Each of the plurality of signals generated by the beamforming U* block 118 may comprise a weighted sum of at least one of the signals received from the FFT blocks 120a . . . 120n.

The channel estimates block 122 may utilize preamble information, contained in a received RF signal, to compute channel estimates. The equalizer block 124 may receive signals generated by the beamforming U* block 118. The equalizer block 124 may process the received signals based on input from the channel estimates block 122 to recover the symbol originally generated by the transmitter 100. The equalizer block 124 may comprise suitable logic, circuitry, and/or code that may be adapted to transform symbols received from the beamforming U* block 118 to compensate for fading in the RF channel.

The plurality of demapper blocks 126a . . . 126n may receive symbols from the equalizer block 124, reverse mapping each symbol to one or more binary bits by applying a demodulation technique, based on the modulation technique utilized in generating the symbol at the transmitter 100. The plurality of demapper blocks 126a . . . 126n may be equal to the number of streams in the transmitter 100.

The deinterleaver block 128 may receive a plurality of bits from each of the demapper blocks 126a . . . 126n, rearranging the order of bits among the received plurality of bits. The deinterleaver block 128 may rearrange the order of bits from the plurality of demapper blocks 126a . . . 126n in, for example, the reverse order of that utilized by the interleaver 106 in the transmitter 100. The depuncture block 130 may insert "null" bits into the output data block received from the deinterleaver block 128 that were removed by the puncture block 104. The Viterbi decoder block 132 may decode a depunctured output data block, applying a decoding technique that may recover the binary data blocks that were input to the coding block 102.

Figure 2:
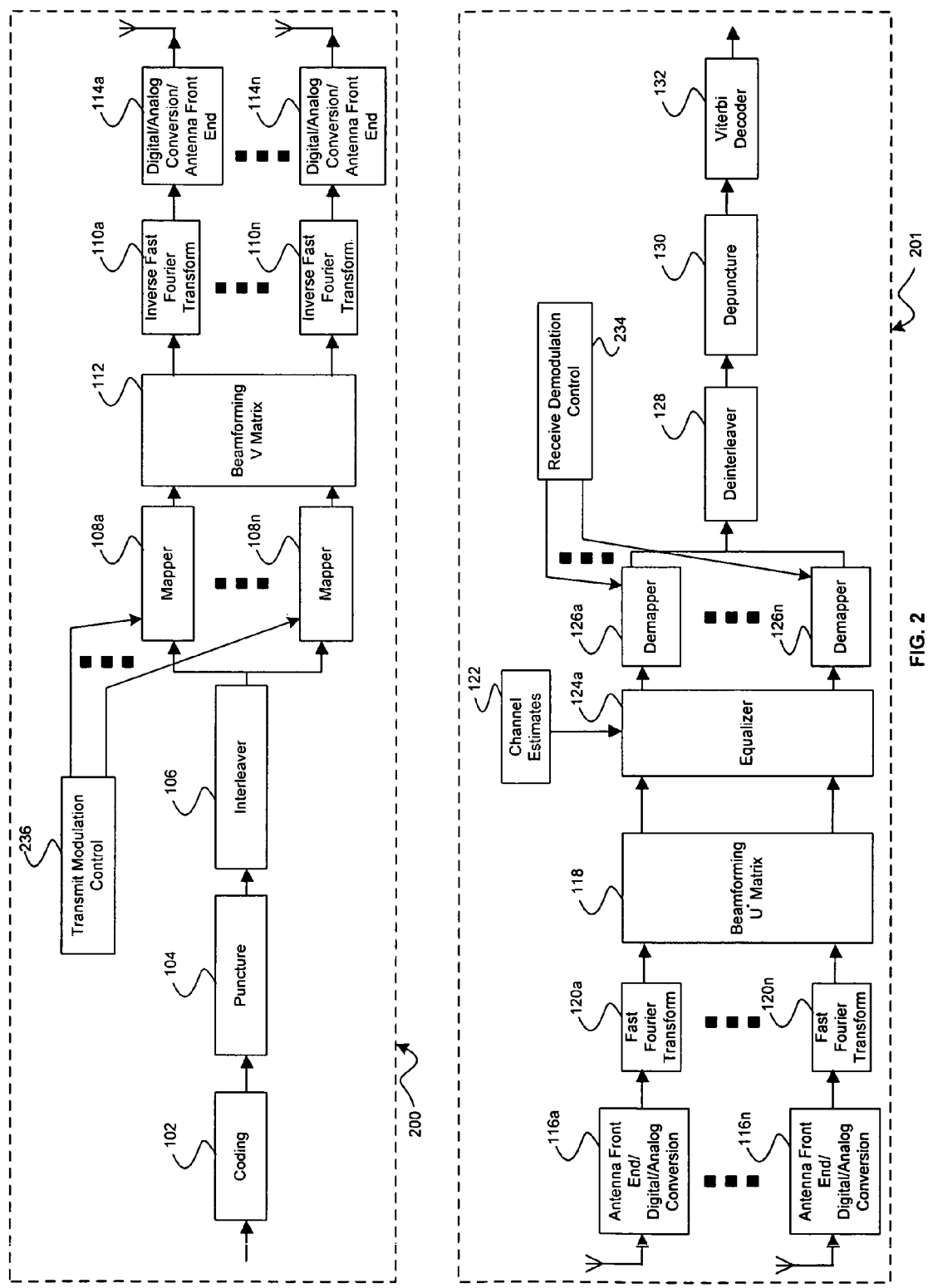
FIG. 2 is an exemplary block diagram of a transmitter with adaptive modulation and a corresponding receiver with adaptive demodulation for a MIMO system, in accordance with an embodiment of the invention.

FIG. 2 is an exemplary block diagram of a transmitter with adaptive modulation and a corresponding receiver with adaptive demodulation for a MIMO system, in accordance with an embodiment of the invention. With reference to FIG. 2 is shown a transmitter 200, and a receiver 201. The transmitter 200 may comprise a transmit modulation control block 236, and a plurality of blocks as shown in the transmitter 100 (FIG. 1). The receiver 201 may comprise a receive demodulation control block 234, and a plurality of blocks as shown in the receiver 101 (FIG. 1). The transmit modulation control block 236 may enable control over the selection of modulation techniques utilized in the transmitter 200. The receive demodulation control block 234 may enable control over the selection of demodulation techniques utilized in the receiver 201. In operation, the transmit modulation control block 236 may enable control of modulation techniques applied by each of the plurality of mapper blocks 108a . . . 108n individually, on a per-stream basis. The receive demodulation control block 234 may enable control of demodulation techniques applied by each of the plurality of demapper blocks 126a . . . 126n individually, on a per-stream basis.

In operation, per-stream control of the mapper blocks 108a . . . 108n may control the number of bits assigned to one or more individual streams, $b_{st}(i)$, to ensure that the sum of bits across the plurality of streams equals the aggregate number of bits in the coding rate-adapted data block, $b_{db}$, as shown in equation [1].

In one aspect of the invention, a system for communicating information in a MIMO communications system, the system may comprise a receiver that may select, for a plurality of spatial streams, a modulation type and/or coding rate. The receiver may communicate at least one message, via an RF channel, that comprises a plurality of modulation types and/or coding rates. The receiver may be configured to receive subsequent data based on at least one selected modulation type and/or coding rate.

In another aspect of a system for communicating information in a MIMO communications system, the system may comprise a transmitter that may receive a message, via an RF channel, that comprises a specification of a plurality of modulation types and/or coding rates, for a plurality of spatial streams. The system may be configured to transmit subsequent data based on at least one of the received modulation types and/or coding rates.

Channel sounding may comprise a plurality of methods by which a transmitter, for example, transmitter 200, and a receiver, for example, receiver 201, may exchange information in a closed loop system. The exchanged information may be utilized by a transmitter such that the transmitter may be configured to transmit subsequent data based on a modulation type and/or coding rate. The exchanged information may be utilized to configure the receiver to receive subsequent data based on a modulation type and/or coding rate. Channel sounding may enable the transmitter to transmit, and the receiver to receive, based on a common modulation type and/or coding rate.

In a MIMO system, embodiments of the invention may enable a transmitter, for example, transmitter 200, and a receiver, for example, receiver 201, to utilize channel sounding mechanisms to exchange information that specifies a modulation type and/or coding rate for each of a plurality of spatial streams. The exchanged information may be utilized to configure the transmitter to transmit subsequent data via an individual spatial stream among a transmitted plurality of spatial streams based on a modulation type and/or coding rate. The exchanged information may be utilized to configure the receiver to receive subsequent data via a corresponding individual spatial stream among a received plurality of spatial streams based on a modulation type and/or coding rate. Channel sounding may enable the transmitter to transmit via an individual spatial stream, and the receiver to receive via a corresponding individual spatial stream, based on a common modulation type and/or coding rate.

Figure 3:
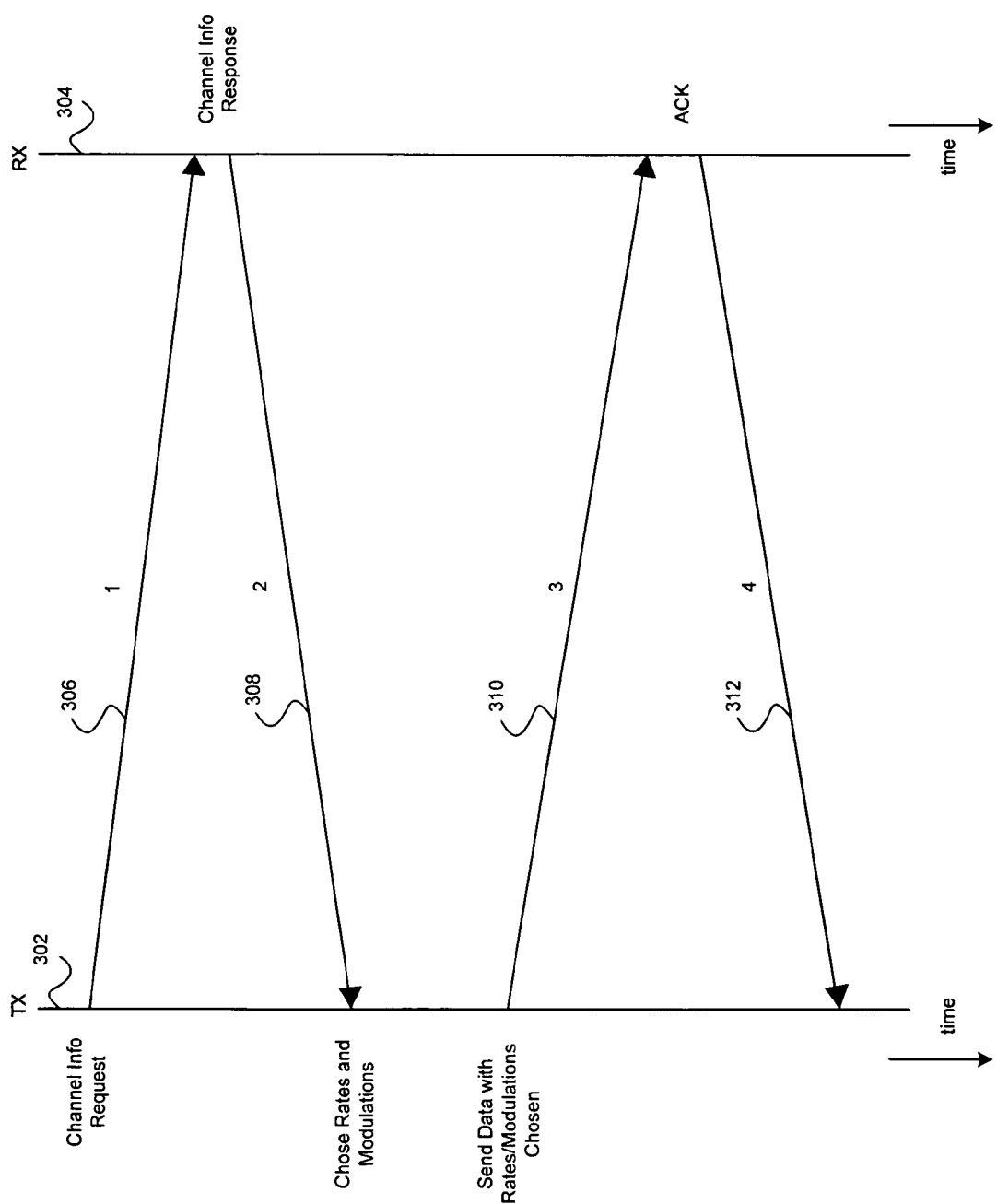
FIG. 3 illustrates an exemplary exchange of information in a channel sounding structure, in accordance with an embodiment of the invention.

FIG. 3 illustrates an exemplary exchange of information in a channel sounding structure, in accordance with an embodiment of the invention. With reference to FIG. 3, there is shown a transmitter 302, a receiver 304, a channel information request message 306, a channel information response message 308, sent data utilizing selected modulation types and/or coding rates 310, and an acknowledgement message 312. The transmitter 302 may transmit a channel information request message 306 to the receiver 304. After receiving the channel information request message 306, the receiver 304 may estimate the channel and interference level for the RF channel utilized for communications in the downlink direction, or downlink channel, from the transmitter 302 to the receiver 304. After receiving the channel information request message 306, the receiver 304 may process the channel information request message 306 for calibration. Information from the receiver 304 may be utilized to transmit a channel information response message 308 via an RF channel utilized for communications in the uplink direction, or uplink channel, from the receiver 304 to the transmitter 302. The channel information response message may comprise signal to noise ratio (SNR) information for each of a plurality of spatial streams received by the receiver 304 via the downlink channel. The channel information response message 308 may alternatively comprise a requested modulation type and/or coding rate for each of a plurality of spatial streams received by the receiver 304 via the downlink channel. Information from the channel information response message 308 may be utilized by the transmitter 302 to choose data rates, utilizing a specified coding rate and/or modulation type for each individual spatial stream, based on feedback channel information from the receiver 304. The transmitter 302 may process the channel information response message 308 for calibration. Beamforming may not be utilized during the transmission of either the channel information request message 306, or the channel information response message 308.

Embodiments of the channel information request message 306, may comprise, but are not limited to, a MIMO mode request frame, or a MIMO channel request frame. Embodiments of the channel information response message 308, may comprise, but are not limited to, a MIMO mode response frame, or a MIMO channel response frame. A frame structure for channel sounding which may utilize a MIMO mode request frame, a MIMO channel request frame, a MIMO mode response frame, and a MIMO channel response frame is described in U.S. application Ser. No. 11/052,353 filed Feb. 7, 2005, and is hereby incorporated herein by reference in its entirety. A message may comprise one or more frames.

A transmitter 302 may transmit subsequent data as sent data utilizing selected modulation types and/or coding rates, or sent data message, 310. The sent data message 310 may comprise a SIGNAL-N (SIG-N) field comprising specification, for a plurality of spatial streams, of a plurality of modulation types and/or coding rate types. In a closed loop MIMO system, each of the plurality of modulation types and/or coding rate types specified in the signal SIG-N field may be based on channel feedback contained in a channel information response message 308, for example, a MIMO mode response frame. If the receiver 304 is able to successfully receive the subsequent data contained in the sent data message 310, an acknowledgement message 312 may be transmitted via the uplink channel.

In an open loop MIMO system, the transmitter 302 may not transmit a channel information request message 306, and information from the receiver 304 may not be utilized to transmit a channel information response message 308. Instead, the transmitter may utilize a "backoff" method to select a modulation type and/or coding rate for a plurality of spatial streams. In an open loop system, the transmitter may select a modulation type and/or coding rate to be utilized in transmitting a sent data message 310 to the receiver. If the receiver successfully receives the sent data message 310, an acknowledgement message 312 may be transmitted. Upon receipt of the acknowledgement message 312, the transmitter may modify a previously selected modulation type and/or coding rate to increase the data rate of subsequent sent data messages 310. If the receiver does not successfully receive the sent data message 310, an acknowledgement message 312 may not be transmitted. If the transmitter does not receive an acknowledgement message 312, the transmitter may modify a previously selected modulation type and/or coding rate to decrease the data rate of subsequent sent data messages 310.

Figure 4:
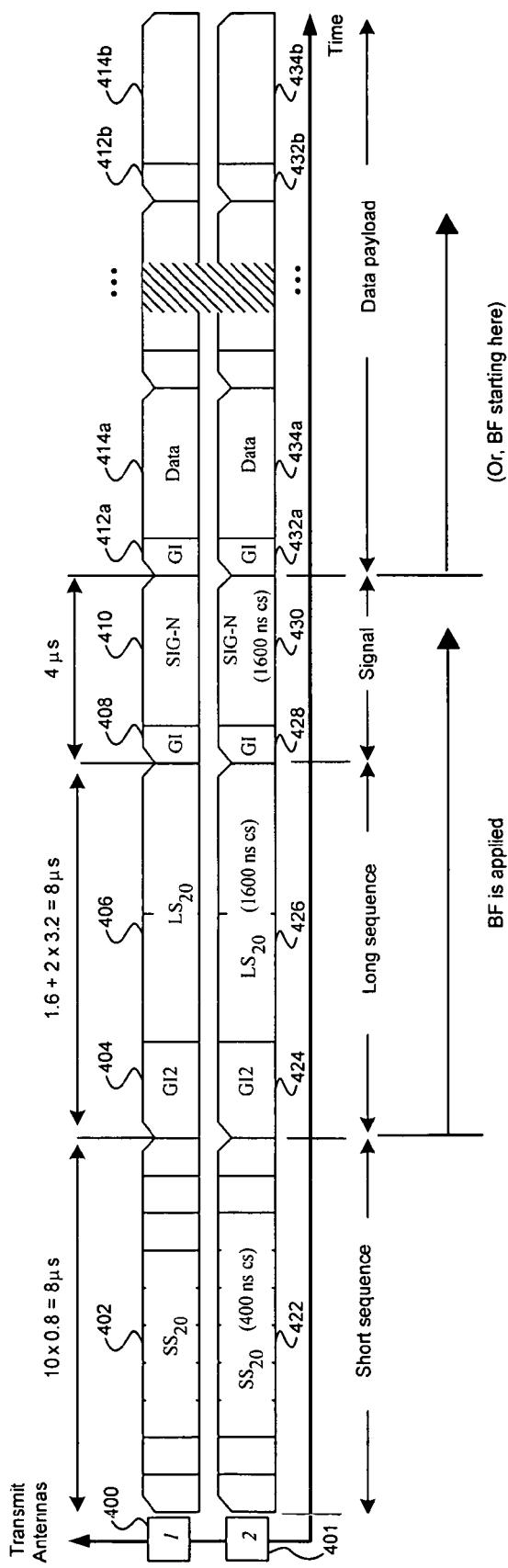
FIG. 4 illustrates an exemplary training sequence for adaptive modulations, in accordance with an embodiment of the invention.

FIG. 4 illustrates an exemplary training sequence for adaptive modulations, in accordance with an embodiment of the invention. With reference to FIG. 4, there is shown a first antenna 400, and a second antenna 401. The PPDU transmitted by the first antenna 400 may comprise a short sequence field 402, a training symbol guard interval (GI2) field 404, a long sequence field 406, a guard interval (GI) field 408, a SIG-N field 410, a plurality of guard interval fields 412a ... 412b, and a plurality of data fields 414a ... 414b. The PPDU transmitted by the second antenna 401 may comprise a short sequence field 422, a training symbol guard interval field 424, a long sequence field 426, a guard interval field 428, a SIG-N field 430, a plurality of guard interval fields 432a ... 432b, and a plurality of data fields 434a ... 434b. A PPDU may comprise a header and a data payload. A physical layer service data unit (PSDU) may comprise a data payload. The preamble to the PSDU transmitted by the first antenna 400 may comprise a short sequence field 402, and a long sequence field 406. The header portion of the PPDU transmitted by the first antenna 400 may comprise the SIG-N field 410. The data payload of the PSDU transmitted by the first antenna 400 may comprise plurality of data fields 414a ... 414b. The preamble to the PPDU transmitted by the second antenna 401 may comprise a short sequence field 422, and a long sequence field 426. The header portion of the PPDU transmitted by the second antenna 401 may comprise the SIG-N field 430. The data payload of the PSDU transmitted by the second antenna 401 may comprise plurality of data fields 434a ... 434b.

The short sequence field 402 may comprise a plurality of short training sequence symbols, for example, 10 short training sequence symbols. Each short training sequence symbol may comprise transmission of information for a defined time interval, for example, 800 nanoseconds (ns). The duration of the short sequence field 402 may comprise a time interval, for example, 8 microseconds (μs). The short sequence field 402 may be utilized by a receiver, for example, receiver 304, for a plurality of reasons, for example, signal detection, automatic gain control (AGC) for low noise amplification circuitry, diversity selection such as performed by rake receiver circuitry, coarse frequency offset estimation, and timing synchronization.

The training symbol guard interval field 404 may comprise a time interval during which the first antenna 400 does not transmit information via an RF channel. The duration of the training symbol guard interval field 404 may comprise a time interval, for example, 1.6 μs. The training symbol guard interval field 404 may be utilized by a receiver, for example, receiver 304, to reduce the likelihood of inter-symbol interference between a preceding symbol, for example, a symbol transmitted during a short sequence field 402, and a succeeding symbol, for example, a symbol transmitted during a long sequence field 406.

The long sequence field 406 may comprise a plurality of long training symbols, for example, 2 long training symbols. Each long training symbol may comprise transmission of information for a defined time interval, for example, 3.2 μs. The duration of the long training sequence, including the duration of the long sequence field 406, and the preceding training symbol guard interval field 404, may comprise a time interval, for example, 8 μs. The long training sequence field 406 may be utilized by a receiver, for example, receiver 304, for a plurality of reasons, for example, fine frequency offset estimation, and channel estimation.

The guard interval field 408, may comprise a time interval during which the first antenna 400 does not transmit information via an RF channel. The duration of guard interval field 408 may comprise a time interval, for example, 800 ns. The guard interval field 408 may be utilized by a receiver, for example, receiver 304, to reduce the likelihood of inter-symbol interference between a preceding symbol, for example, a symbol transmitted during a long sequence field 406, and a succeeding symbol, for example, a symbol transmitted during a the signal SIG-N field 410.

The signal SIG-N field 410 may comprise, for example, a signal symbol. Each signal symbol may comprise transmission of information for a defined time interval, for example, 3.2 μs. The duration of the single symbol, including the duration of the signal SIG-N field 410, and the preceding guard interval field 408, may comprise a time interval, for example, 4 μs. The signal SIG-N field 410 may be utilized by a receiver, for example, receiver 304, to establish a plurality of configuration parameters associated with receipt of a physical layer service data unit (PSDU) via an RF channel.

The guard interval field 412a, may comprise a time interval during which the first antenna 400 does not transmit information via an RF channel. The duration of guard interval field 412a may comprise a time interval, for example, 800 ns. The guard interval field 412a may be utilized by a receiver, for example, receiver 304, to reduce the likelihood of inter-symbol interference between a preceding symbol, for example, a symbol transmitted during a signal SIG-N field 410, and a succeeding symbol, for example, a symbol transmitted during a the data field 414a. Each successive guard interval field in the plurality of guard interval fields 412a ... 412b may be utilized by a receiver, for example, receiver 304, to reduce the likelihood of inter-symbol interference between a preceding symbol, for example, a symbol transmitted during the plurality of data fields 414a ... 414b, and a succeeding symbol in the plurality of data fields 414a ... 414b.

A data field in the plurality of data fields 414a ... 414b may comprise, for example, a data symbol. Each data symbol may comprise transmission, by the first antenna 400, of information for a defined time interval, for example, 3.2 μs. The duration of each data interval, including the duration of a data field in the plurality of data fields 414a ... 414b, and the preceding guard interval field in the plurality of guard interval fields 412a ... 412b, may comprise a time interval, for example, 4 μs. The plurality of data fields 414a ... 414b may be utilized by a receiver, for example, receiver 304, to receive information that is contained in a PSDU data payload received via an RF channel.

The short sequence field 422, training symbol guard interval field 424, long sequence field 426, guard interval 428, and signal SIG-N field 430 may comprise time shifted, or cyclically shifted, representations of the corresponding short sequence field 402, training symbol guard interval field 404, long sequence field 406, guard interval 408, and signal SIG-N field 410. The start of transmission of the cyclically shifted version short sequence field 422 by the second antenna 401 may precede the start of transmission of the short sequence field 402 by the first antenna 400 by an interval, for example, 400 ns. The start of transmission of the cyclically shifted version long sequence field 426 by the second antenna 401 may precede the start of transmission of the long sequence field 406 by the first antenna 400 by an interval, for example, 1600 ns. The start of transmission of the cyclically shifted version signal SIG-N field 430 by the second antenna 401 may precede the start of transmission of the signal SIG-N field 410 by the first antenna 400 by an interval, for example, 1600 ns.

The guard interval field 432a, may comprise a time interval during which the second antenna 401 does not transmit information via an RF channel. The duration of guard interval field 432a may comprise a time interval, for example, 800 ns. The guard interval field 432a may be utilized by a receiver, for example, receiver 304, to reduce the likelihood of inter-symbol interference between a preceding symbol, for example, a symbol transmitted during a signal SIG-N field 430, and a succeeding symbol, for example, a symbol transmitted during a the data field 434a. Each successive guard interval field in the plurality of guard interval fields 432a . . . 432b may be utilized by a receiver, for example, receiver 304, to reduce the likelihood of inter-symbol interference between a preceding symbol, for example, a symbol transmitted during the plurality of data fields 434a . . . 434b, and a succeeding symbol in the plurality of data fields 434a . . . 434b.

The data field in the plurality of data fields 434a . . . 434b may comprise, for example, a data symbol. Each data symbol may comprise transmission, by the second antenna 401, of information for a defined time interval, for example, 3.2 μs. The duration of each data interval, including the duration of a data field in the plurality of data fields 434a . . . 434b, and the preceding guard interval field in the plurality of guard interval fields 432a . . . 432b, may comprise a time interval, for example, 4 μs. The plurality of data fields 434a . . . 434b may be utilized by a receiver, for example, receiver 304, to receive information that is contained in a PSDU data payload received via an RF channel.

In operation, the short sequence field 402, and the long sequence field 406, is specified in IEEE resolution 802.11. The short sequence and long sequence fields may be transmitted by the first antenna 400, of a transmitter, for example, transmitter 302, and received by a receiver, for example, receiver 304. For example, the receiver may compare a received long sequence field against the well known expected values to determine an extent to which transmission impairments may exist in the downlink channel. Channel estimates may be derived for the downlink channel. The channel estimates may comprise SNR information and may comprise information about individual spatial streams that may be transmitted via the downlink channel.

The short sequence field 422, and the long sequence field 426, is specified in IEEE resolution 802.11. The short sequence and long sequence fields may be transmitted by the second antenna 401, of a transmitter, for example, transmitter 302, and received by a receiver, for example, receiver 304. For example, the receiver may compare a received long sequence field against the well known expected values to determine an extent to which transmission impairments may exist in the downlink channel. Channel estimates may be derived for the downlink channel. The channel estimates may comprise SNR information and may comprise information about individual spatial streams that may be transmitted via the RF or downlink channel.

The preamble portion and header portion of the PPDU transmitted by the first antenna 400 may be transmitted utilizing a well known modulation type and coding rate. The utilization of a well known modulation type and coding rate may enable a transmitter, for example, transmitter 302, and a receiver, for example, receiver 304, to communicate until modulation type and coding rate information has been exchanged. The modulation type may comprise binary phase shift keying (BPSK). The coding rate may be represented as ½. The modulation type and coding rate may represent the lowest data rate at which data may be transmitted via a spatial stream in an RF channel. Channel information request messages 306, and channel information response messages 308, may be transmitted utilizing the modulation type and coding rate for each transmitted spatial stream. The header portion of the PSDU transmitted by the first antenna comprising the signal SIG-N field 410, and the plurality of data fields 414a . . . 414b, may comprise a physical layer service data unit (PSDU).

Beamforming, which may also be referred to as Eigenbeamforming, may be utilized during transmission of the sent data message 310, at the beginning of the long training sequence (LTS), which may correspond to the beginning of the training symbol guard interval 404. Alternatively, beamforming may be utilized at the start of reception of the data payload, which may correspond to the beginning of the guard interval 412a. The receiver, for example, receiver 304, may determine that a received PSDU was transmitted utilizing beamforming after the receiver, and the transmitter, for example, transmitter 302, exchange channel sounding messages comprising, for example, the channel information request message 306, and the channel information response message 308. The receiver may determine that a received frame is processed utilizing adaptive modulation based on the signal SIG-N field 410. Adaptive modulation may comprise modifying at least one modulation type and/or coding rate for at least one transmitted spatial stream based on channel feedback information in a closed loop MIMO system.

The preamble portion and header portion of the PPDU transmitted by the second antenna 401 may be transmitted utilizing a modulation type and coding rate. The utilization of a modulation type and coding rate may enable a transmitter, for example, transmitter 302, and a receiver, for example, receiver 304, to communicate until modulation type and coding rate information has been exchanged. The modulation type may comprise binary phase shift keying (BPSK). The coding rate may be represented as ½. The modulation type and coding rate may represent the lowest data rate at which data may be transmitted via a spatial stream in an RF channel. Channel information request messages 306, and channel information response messages 308, may be transmitted utilizing the modulation type and coding rate for each transmitted spatial stream. The header portion of the PSDU transmitted by the first antenna comprising the signal SIG-N field 430, and the plurality of data fields 434a . . . 434b, may comprise a physical layer service data unit (PSDU).

Beamforming, which may also be referred to as Eigenbeamforming, may be utilized during transmission of the sent data message 310, at the beginning of the long training sequence (LTS), which may correspond to the beginning of the training symbol guard interval 424. Alternatively, beamforming may be utilized at the start of reception of the data payload, which may correspond to the beginning of the guard interval 432a. The receiver, for example, receiver 304, may determine that a received PSDU was transmitted utilizing beamforming after the receiver, and the transmitter, for example, transmitter 302, exchange channel sounding messages comprising, for example, the channel information request message 306, and the channel information response message 308. The receiver may determine that a received frame is processed utilizing adaptive modulation based on the signal SIG-N field 430. Adaptive modulation may comprise modifying at least one modulation type and/or coding rate for at least one transmitted spatial stream based on channel feedback information in a closed loop MIMO system.

Figure 5:
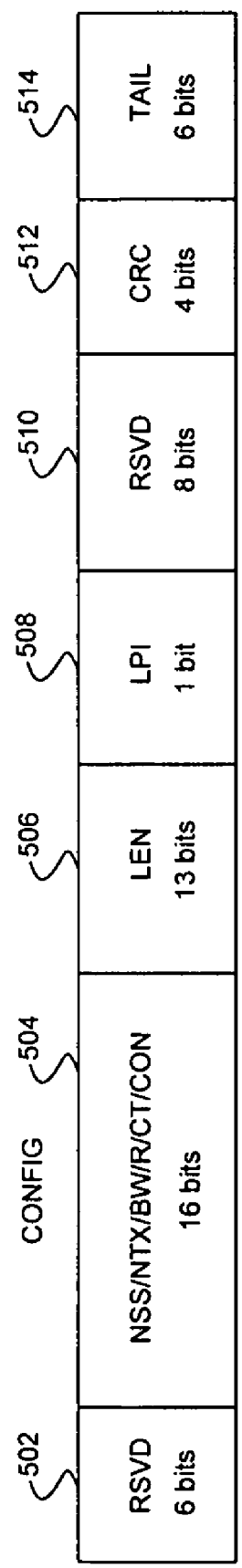
FIG. 5 illustrates a current configuration of the SIG-N field, which may be utilized in connection with an embodiment of the invention.

FIG. 5 illustrates a current configuration of the SIG-N field, which may be utilized in connection with an embodiment of the invention. With reference to FIG. 5, there is shown a reserved field (RSVD) 502, a configuration field 504, a length (LEN) field 506, a last PSDU indicator (LPI) field 508, a RSVD field 510, a cyclical redundancy check (CRC) field 512, and a tail field 514. The reserved field 502 may comprise 6 bits of binary information. The reserved field 510 may comprise 8 bits of binary information. The reserved fields 502 and 510 may have no assigned usage. The configuration field 504 may comprise 16 bits of binary information. The configuration field 504 may comprise configuration information about a signal transmitted by an antenna, for example, antenna 400.

The configuration field 504 may comprise information that indicates the number of spatial streams utilized in transmitting information contained in a message between a transmitter, for example, 302, and a receiver, for example, 304. The configuration field 504 may comprise information that indicates the number of transmitting antennas, for example, antennas 400 and 401, utilized in transmitting information between a transmitter and a receiver. The configuration field 504 may comprise information that indicates the bandwidth that is utilized in transmitting information between a transmitter and a receiver. The configuration field 504 may comprise information that indicates the coding rate that is utilized in transmitting information via an antenna, for example, antenna 400. The configuration field 504 may comprise information that indicates the error correcting code type that is utilized in transmitting information via an antenna. The configuration field 504 may comprise information that indicates the constellation type, or modulation type, which may be utilized for transmitting information via an antenna.

The length field 506 may comprise 13 bits of binary information. The length field 506 may comprise information that indicates the number of binary octets of data payload information in data fields 414a . . . 414b transmitted via an antenna, for example antenna 400. The indicator LPI field 508 may comprise 1 bit of binary information. The indicator LPI field 508 may comprise information that indicates whether the data payload, for example, the plurality of data fields 414a . . . 414b, represent that last information comprised in a message. The cyclical redundancy check field 512 may comprise 4 bits of binary information. The cyclical redundancy check field 512 may comprise information that may be utilized by a receiver, for example, receiver 304, to detect the presence of errors in a received PPDU, for example, the header SIG-N field 410. The tail field 514 may comprise 6 bits of binary information. The tail field 514 may comprise information that is appended following the cyclical redundancy check field 512 to pad the SIG-N field to a desired length.

Figure 6A:
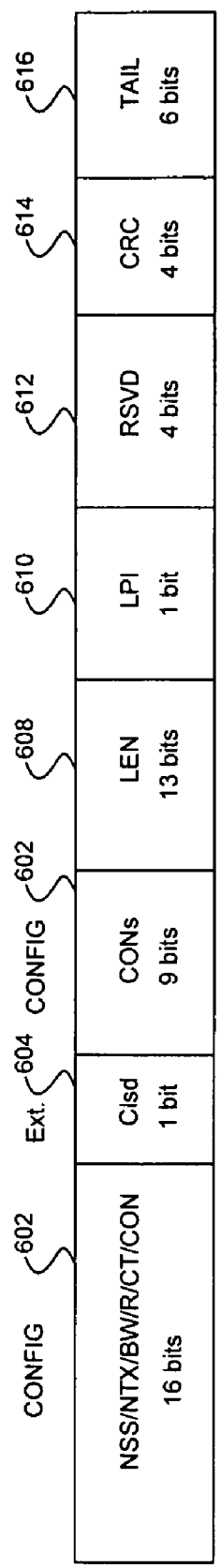
FIG. 6a illustrates exemplary changes to the SIG-N field, in accordance with an embodiment of the invention.

FIG. 6a illustrates exemplary changes that may be made to the SIG-N field, in accordance with an embodiment of the invention. With reference to FIG. 6a, there is shown a configuration field 602, a closed loop (clsd) field 604, a length field 608, an indicator LPI field 610, a reserved field 612, a cyclical redundancy check field 614, a reserved field 612, a cyclical redundancy check field 614, and a tail field 616. The reserved field 612 may comprise 4 bits of binary information. The reserved field 612 may have no assigned usage. The length field 606 may be as described for the length field 506. The indicator LPI field 610 may be as described for the indicator LPI field 508. The cyclical redundancy check field 614 may be as described for the cyclical redundancy check field 512. The tail field 616 may be as described for the tail field 514.

The configuration field 602 may comprise a total of 25 bits of binary information. A first portion of the configuration field 602 may comprise 16 bits of binary information, and a second portion of the configuration field 602 may comprise 9 bits of binary information. The configuration field may comprise configuration information about a signal transmitted by an antenna, for example, antenna 400. The configuration field 602 may accommodate specification of a modulation type for each of a plurality of spatial streams that may be transmitted via an antenna. The closed loop field 604 may indicate whether a transmitter, for example, transmitter 302, utilized MIMO closed loop feedback information in transmitting information via an antenna. The constellations field 606 may comprise 9 bits of binary information.

With reference to FIG. 5 and in comparison with FIG. 6a, there may be a total of 14 bits in the reserved fields 502 and 510, in comparison to 4 bits in the reserved field 612. Thus, the reserved field 612 in the exemplary signal SIG-N field of FIG. 6a, may comprise 10 fewer bits than the total number of bits that may be contained in the reserved fields 502 and 510 in the exemplary signal SIG-N field of FIG. 5. In the exemplary SIG-N field shown in FIG. 6a, an additional 9 bits may be included, which may accommodate, in the configuration field 602, specification of a modulation type for each of a plurality of spatial streams transmitted via an antenna, for example, antenna 400. The closed loop field 604 may comprise an additional 1 bit of binary information. Thus, the exemplary signal SIG-N field illustrated in FIG. 5 may comprise the same number of binary bits as may the exemplary signal SIG-N field illustrated in FIG. 6a.

Figure 6B:
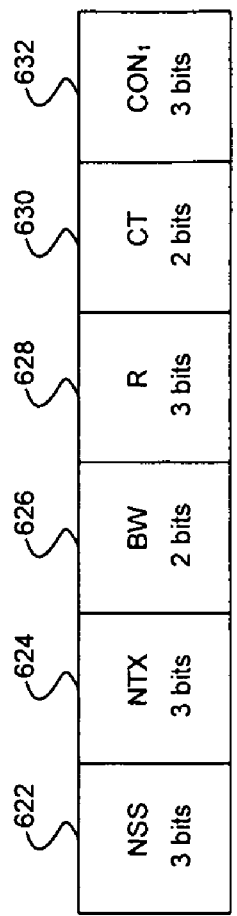
FIG. 6b illustrates an exemplary first portion of the configuration field, in accordance with an embodiment of the invention.

FIG. 6b illustrates an exemplary first portion of the configuration field, in accordance with an embodiment of the invention. With reference to FIG. 6b there is shown a number of spatial streams field 622, a number of transmitting antenna field 624, a bandwidth field 626, a coding rate field 628, an error correcting code type field 630, and a first constellation type field 632.

The number of spatial streams field 622 may comprise 3 bits of binary data. The number of spatial streams field 622 may indicate the number of spatial streams utilized in transmitting information between a transmitter, for example, 302, and a receiver, for example, 304. In a MIMO system the number of spatial streams may represent a number, for example, 1, 2, 3, or 4. The number of transmitting antenna field 624 may comprise 3 bits of binary data. The number of transmitting antenna field 624 may indicate the number of transmitting antenna, for example, antenna 400, utilized in transmitting information between a transmitter and a receiver. In a MIMO system the number of transmitting antenna may represent a number, for example, 1, 2, 3, or 4. The bandwidth field 626 may comprise 2 bits of binary data. The bandwidth field 626 may indicate the bandwidth that is utilized for transmitting information between a transmitter and a receiver. In a MIMO system the bandwidth may represent a bandwidth, for example, 20 MHz, or 40 MHz. The coding rate field 628 may comprise 3 bits of binary data. The coding rate field 628 may indicate the coding rate that is utilized in transmitting a physical layer service data unit (PSDU) that is transmitted via an antenna. In a MIMO system the coding rate may represent a number, for example, ½, ⅔, ¾, or ⅚. The error correcting code type field 630 may comprise 2 bits of binary data. The error correcting code type field 630 may indicate the error correcting code type that is utilized in transmitting information via an antenna. In a MIMO system, the error correcting code type may represent an error correcting coding method, for example, binary convolutional coding (BCC), or low density parity coding (LDPC). The first constellation type field 632 may comprise 3 bits of binary data. The first constellation type field 632 may indicate the constellation type, or modulation type, which is utilized in transmitting a PSDU in a first spatial stream via an antenna. In a MIMO system, the modulation type may represent a constellation indicating the number of binary bits that may be encoded in a symbol, for example, binary phase shift keying (BPSK), quaternary phase shift keying (QPSK), 16 level quadrature amplitude modulation (16 QAM), 64 level QAM (64 QAM), or 256 level QAM (256 QAM).

Figure 6C:
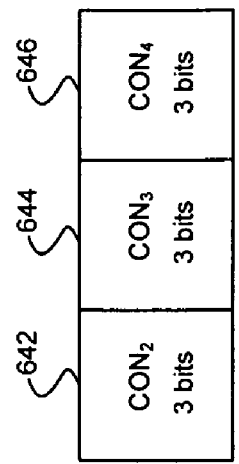
FIG. 6c illustrates an exemplary second portion of the configuration field, in accordance with an embodiment of the invention.

FIG. 6c illustrates an exemplary second portion of the configuration field, in accordance with an embodiment of the invention. With reference to FIG. 6c, there is shown a second constellation type field 642, a third constellation type field 644, and a fourth constellation type field 646. The second constellation type field 642 may comprise 3 bits of binary data. The second constellation type field 642 may indicate the constellation type, or modulation type, which is utilized in transmitting a PSDU in a second spatial stream via an antenna, for example, antenna 400. The third constellation type field 644 may comprise 3 bits of binary data. The third constellation type field 644 may indicate the constellation type, or modulation type, which is utilized in transmitting a PSDU in a third spatial stream via an antenna. The fourth constellation type field 646 may comprise 3 bits of binary data. The fourth constellation type field 646 may indicate the constellation type, or modulation type, which is utilized in transmitting a PSDU in a fourth spatial stream via an antenna.

In operation, in a closed loop MIMO system, the plurality of fields comprising the first constellation type field 632, the second constellation type field 642, the third constellation type field 644, and the fourth constellation type field 646, may be utilized by a receiver, for example, receiver 304, to select, for a plurality of spatial streams, at least one modulation type and/or coding rate. A receiver may select a unique modulation type and/or coding rate for each of a plurality of spatial streams transmitted by an antenna, for example, antenna 400. The selected modulation types and coding rates may be communicated in a channel information response message 308 via an uplink channel. A transmitter, for example transmitter 302, may receive a channel information response message 308 transmitted via an RF channel that comprises specification of, for a plurality of spatial streams, a plurality of modulation types and/or coding rates. The transmitter may configure for transmitting subsequent data, for example, a sent data message 310 comprising a PSDU, based on at least one modulation type and/or coding rate received in channel information response message 308.

The modulation and/or coding rate may comprise a specification of one of the plurality of spatial streams by the receiver, and a specification of a corresponding spatial stream transmitted as a part of at least a portion of a plurality of spatial streams by a transmitter. A transmitter may receive a specification of a plurality of modulation types and/or coding rates for a plurality of spatial streams. The transmitter may then utilize each of the plurality of modulation types and/or coding rates specified by a receiver, for a plurality of spatial streams, to transmit subsequent data utilizing a corresponding one of a plurality of transmitted spatial streams. A transmitter may receive a specification of a plurality of modulation types and/or coding rates for a plurality of spatial streams. The transmitter may then utilize at least one specified modulation type and/or coding rate to transmit subsequent data utilizing at least one spatial stream.

In one embodiment of the invention, in a closed loop MIMO system, a receiver, for example, receiver 304, may generate channel feedback information based on at least one SNR for a plurality of spatial streams. The generated channel feedback information may be communicated in a channel information response message 308 via an uplink channel. A transmitter, for example, transmitter 302, may receive a channel information response message 308 that comprises channel feedback information based on at least one SNR observed by the receiver for a plurality of spatial streams. The transmitter may select, for a plurality of spatial streams, a plurality of modulation types and/or coding rates. The transmitter may configure for transmitting subsequent data, for example, a sent data message 310 comprising a PSDU, based on at least one selected modulation type and/or coding rate that had been selected based on the channel feedback information.

In another embodiment of the invention, in an open loop MIMO system, a transmitter, for example, transmitter 302, may select, for a plurality of spatial streams, a plurality of modulation types and/or coding rates. The transmitter may configure for transmitting subsequent data, for example, a sent data message 310, based on a modulation type selected for previously transmitted data, and/or an acknowledgement frame from the receiving indicating that previously transmitted data was successfully received.

In either closed loop, or open loop, MIMO systems, the transmitter, for example, transmitter 302, may communicate to the receiver, for example, receiver 304, information comprising specification of the modulation types and/or coding rate types that were utilized in transmitting subsequent data via the signal SIG-N message field, for example, the exemplary SIG-N field shown in FIG. 6a, contained in a PSDU. The first constellation type field 632, second constellation type field 642, third constellation type field 644, and fourth constellation type field 646 may comprise specification of the modulation types utilized in the corresponding first spatial stream, second spatial stream, third spatial stream, and fourth spatial stream that was transmitted by a transmitting antenna, for example, antenna 400. Whether subsequent data was transmitted in a closed loop, or in an open loop may be determined by a receiver based on the closed loop field 604.

If the closed loop field 604 clsd=0 and the number of spatial streams (Nss), represented by the number of spatial streams field 622, is approximately equal to, or one less than, the number of transmitting antenna (Ntx) represented by the number of transmitting antenna field 624, this may indicate that a transmitter, for example, the transmitter 302, may be transmitting data without beamforming, and utilizing spatial division multiplexing (SDM), or space-time block coding (STBC). If the closed loop field 604 clsd=1 and each of the constellation type fields 632, 642, 644, and 646 contains equal numerical values, this may indicate that the transmitter may be transmitting utilizing Eigenbeamforming, but while not utilizing streamloading, or utilizing individual per-stream adaptive modulation. If streamloading is not utilized, each spatial steam may utilize an equivalent modulation type, and the data rate for each spatial stream may be equivalent. If streamloading is utilized, some spatial streams may utilize different modulation types, and the data rates for some spatial streams may differ from those of other spatial streams. Adaptive modulation may enable a transmitter to adapt the data rate for a spatial stream, to increase or decrease, based on channel feedback information. In embodiments of the invention, the modulation type, and/or coding rate, may be adapted individually for each spatial stream.

In general, transmission utilizing beamforming may be indicated when the closed loop field 604 clsd is equal to 1. A transmitter, for example, transmitter 302, may receive a message, via an uplink channel, comprising specification of, for a plurality of spatial streams, a plurality of modulation types and/or coding rates. The transmitter may utilize at least one specified modulation type and/or coding rate to transmit subsequent data via at least one transmitted spatial stream while utilizing beamforming. If the individual constellation type fields 632, 642, 644, and 646 do not each comprise equal numerical values while the closed loop field clsd=1, this may indicate that the plurality of streams do not utilize the same modulation type.

When the closed loop field 604 clsd=0 and there are no sounding message exchanges, the receiver may determine that the transmitter that transmitted subsequent data in an open loop system, in which the transmitter may not have utilized channel feedback information, beamforming or adaptive modulations.

Figure 7:
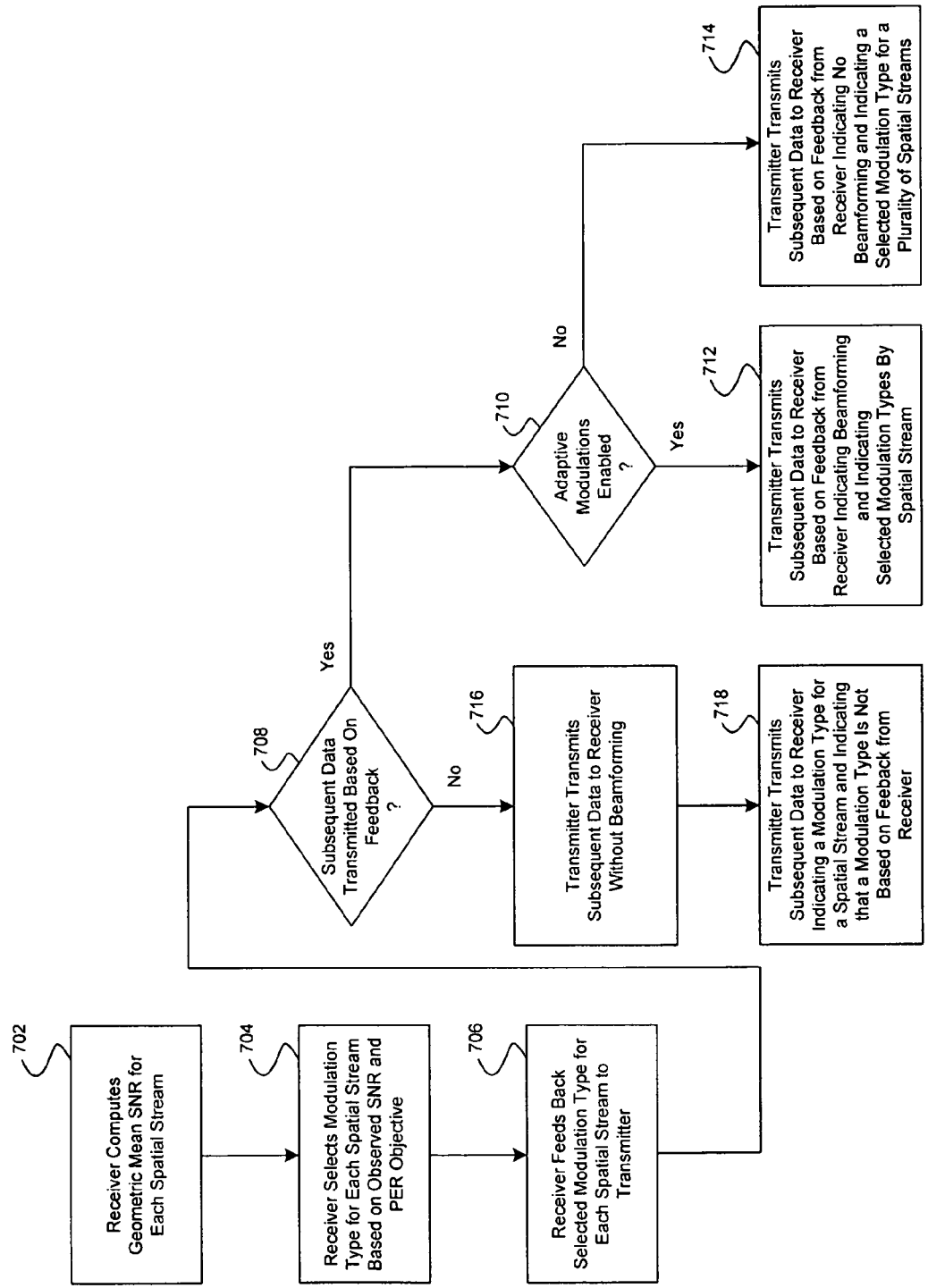
FIG. 7 is a flowchart illustrating exemplary steps for closed loop modulation type requested by a receiver, in accordance with an embodiment of the invention.

FIG. 7 is a flowchart illustrating exemplary steps for closed loop modulation type requested by a receiver, in accordance with an embodiment of the invention. With reference to FIG. 7, in step 702, a receiver may compute geometric mean SNRs for each spatial stream. In step 704, a receiver may select a modulation type for each spatial stream based on observed SNR and packet error rate (PER) objectives. In step 706, a receiver may feed back the selected modulation type for each spatial stream to a transmitter. Step 708 may determine if subsequent data was transmitted based on feedback information. If not, in step 716, the transmitter may transmit subsequent data to a receiver without utilizing beamforming. In step 718, the transmitter may transmit subsequent data to the receiver indicating a selected modulation type for a plurality of spatial streams and indicating that the selected modulation type may not be based on feedback information from the receiver.

If step 708 determines that subsequent data was transmitted based on feedback information, beamforming may be utilized and step 710 may determine if adaptive modulations are enabled. If so, in step 712 the transmitter may transmit subsequent data to the receiver based on feedback information from the receiver and indicating that beamforming was utilized along with the selected modulation types by spatial stream. If step 710 determined that beamforming was not utilized, in step 714, the transmitter may transmit subsequent data to the receiver based on feedback information from the receiver indicting that beamforming was not utilized and indicating a modulation type selected by the receiver for a plurality of transmitted spatial streams.

Figure 8:
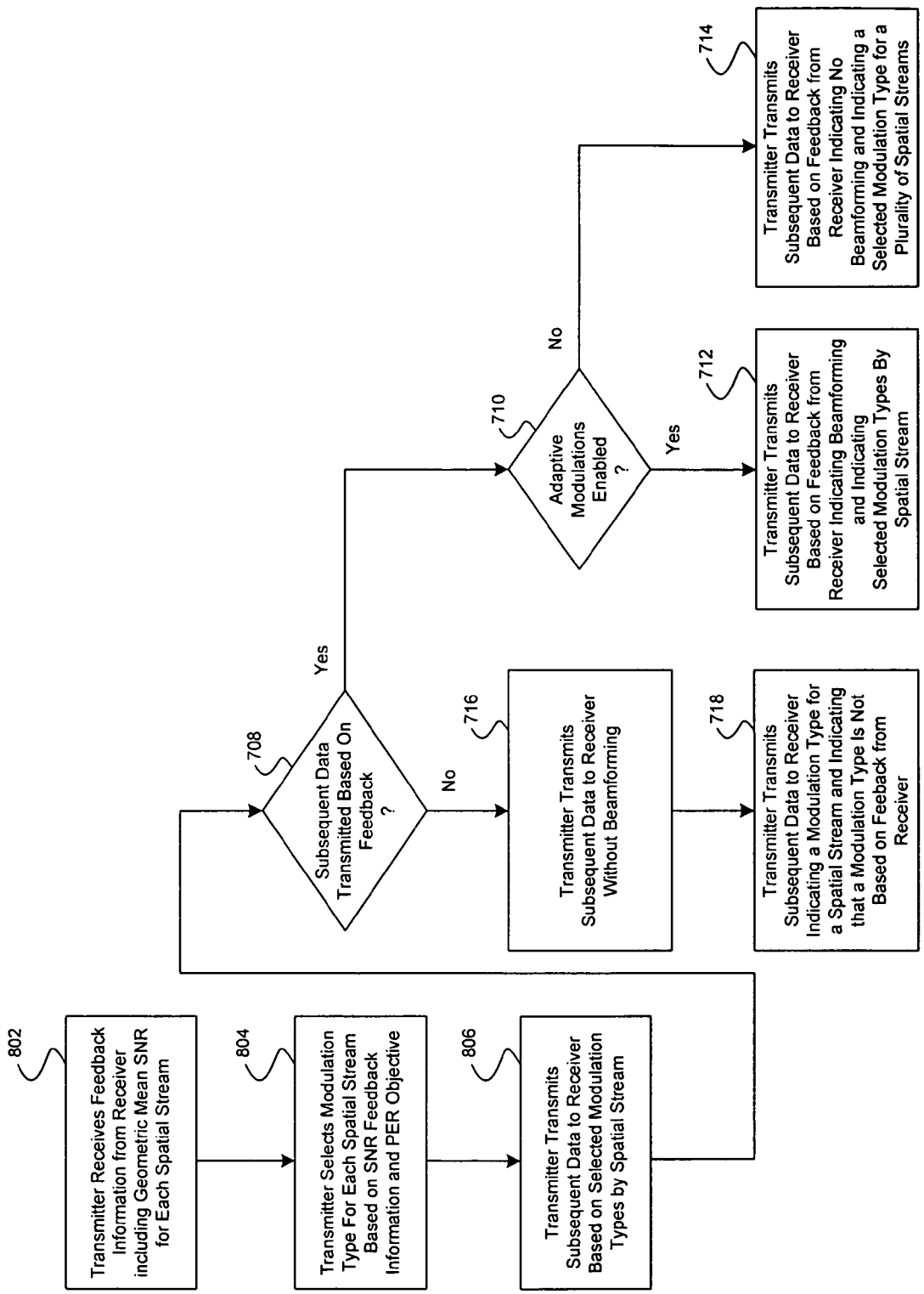
FIG. 8 is a flowchart illustrating exemplary steps for closed loop modulation type determined by a transmitter based on channel feedback from a receiver, in accordance with an embodiment of the invention.

FIG. 8 is a flowchart illustrating exemplary steps for closed loop modulation type determined by a transmitter based on channel feedback from a receiver, in accordance with an embodiment of the invention. With reference to FIG. 8, in step 802 a transmitter may receive feedback information from the receiver that includes geometric mean SNR for each spatial stream. In step 804, the transmitter may select a modulation type for each spatial stream based on SNR feedback information and PER objectives. In step 806, the transmitter may transmit subsequent data to the receiver based on the selected modulation type for each spatial stream. The process continues as described for step 708.

Figure 9:
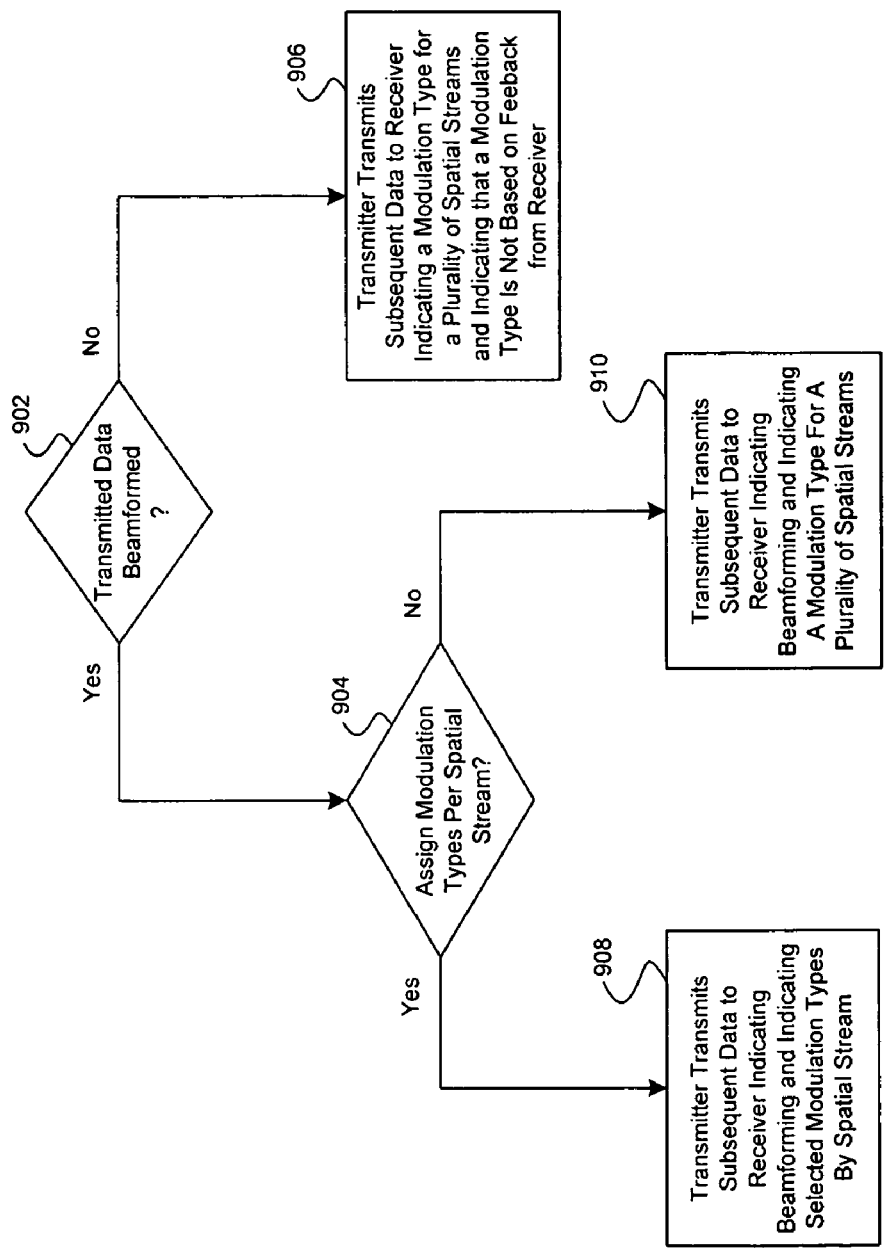
FIG. 9 is a flowchart illustrating exemplary steps for open loop modulation type determined by a transmitter, in accordance with an embodiment of the invention.

FIG. 9 is a flowchart illustrating exemplary steps for open loop modulation type determined by a transmitter, in accordance with an embodiment of the invention. With reference to FIG. 9, in step 902 a transmitter may determine whether to transmit data utilizing beamforming. The transmitter may make this determination based on whether beamforming is currently being utilized. The transmitter may also base the determination on the status of successfully acknowledge frames at the receiver. If beamforming is utilized, in step 904, the transmitter may determine whether to assign modulation types per spatial stream. If so, in step 908, the transmitter may transmit subsequent data to the receiver indicating beamforming, and indicating a selected modulation type per spatial stream. If beamforming is to be utilized but modulations are not to be assigned per spatial stream, in step 910 the transmitter may transmit subsequent data to the receiver indicating beamforming and indicating a modulation type for a plurality of spatial streams. If beamforming is not utilized following step 902, in step 906 the transmitter may transmit subsequent data to the receiver indicating a modulation type for a plurality of spatial streams, and indicating that a modulation type is not based on feedback from the receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information, the method comprising:
performing by one or more processors and/or circuits in a multiple input multiple output (MIMO) communications system:
receiving signals via a plurality of spatial streams;
computing a corresponding geometric mean signal to noise ratio (SNR) value for each of said plurality of spatial streams based on said received signals;
selecting a corresponding plurality of modulation type identifiers and/or one or more coding rate identifiers based on said plurality of computed corresponding geometric mean signal to noise ratio values;
communicating a physical layer protocol data unit (PPDU), via one or more uplink radio frequency (RF) channels, said communicated physical layer protocol data unit comprising one or more fields comprising said selected corresponding plurality of modulation type identifiers; and
receiving one or more subsequent physical layer protocol data units, wherein a header portion of said received one or more subsequent physical layer protocol data units comprises a plurality of modulation type identifier values, wherein at least a portion of said plurality of modulation type identifier values is based on at least a portion of one or both of said selected corresponding plurality of modulation type identifiers and/or said selected one or more coding rate identifiers.

2. The method according to claim 1, comprising receiving said received one or more subsequent physical layer protocol data units via one or more downlink RF channels.

3. The method according to claim 1, comprising generating said received one or more subsequent physical layer protocol data units based on subsequent signals received via said plurality of spatial streams.

4. The method according to claim 3, comprising generating said received one or more subsequent physical layer protocol data units by decoding said received subsequent signals based on at least a portion of said plurality of modulation type identifier values.

5. The method according to claim 1, wherein said header portion of said received one or more subsequent physical layer protocol data units comprise a closed loop indicator field.

6. The method according to claim 1, comprising determining an adaptive modulation indication for receiving said received one or more subsequent physical layer protocol data units based on a comparison of said plurality of modulation type identifier values.

7. The method according to claim 5, comprising determining a beamforming indication for receiving said received one or more subsequent physical layer protocol data units based on a value for said closed loop indicator field.

8. A method for communicating information, the method comprising:
performing by one or more processors and/or circuits in a MIMO communications system:
generating a physical layer protocol data unit (PPDU);
configuring a value for a closed loop indicator field, wherein a header portion of said generated physical layer protocol data unit comprises said closed loop indicator field; and
transmitting said generated physical layer protocol data unit via a plurality of spatial streams, utilizing beamforming, based on said configured value for said closed loop indicator field.

9. The method according to claim 8, wherein said header portion comprises a plurality of modulation type identifier fields.

10. The method according to claim 9, comprising configuring a corresponding value for each of said plurality of modulation type identifier fields, wherein said plurality of modulation type identifier fields correspond to said plurality of spatial streams.

11. The method according to claim 10, comprising encoding at least a portion of said generated physical layer protocol data unit for said transmitting via a corresponding one of said plurality of spatial streams based on said corresponding value for said corresponding one of said plurality of spatial streams.

12. The method according to claim 10, wherein each said configured corresponding value is equal based on said configured value for said closed loop indicator field.

13. The method according to claim 8, comprising transmitting a beamforming indication for receiving said transmitted physical layer protocol data unit based on said configured value for said closed loop indicator field.

14. The method according to claim 8, comprising determining said configured value for said closed loop indicator field based on one or more received physical layer protocol data units.

15. A system for communicating information in a multiple input multiple output (MIMO) communications system, the system comprising:
a receiver, in a multiple input multiple output (MIMO) communications system, that is operable to receive signals via a plurality of spatial streams;
said receiver is operable to compute a corresponding geometric mean signal to noise ratio (SNR) value for each of said plurality of spatial streams based on said received signals;
said receiver is operable to select a corresponding plurality of modulation type identifiers and/or one or more coding rate identifiers based on said plurality of computed corresponding geometric mean signal to noise ratio values;
said receiver is operable to communicate a physical layer protocol data unit (PPDU), via one or more uplink radio frequency (RF) channels, said communicated physical layer protocol data unit comprising one or more fields comprising said selected corresponding plurality of modulation type identifiers; and
said receiver is operable to receive one or more subsequent physical layer protocol data units, wherein a header portion of said received one or more subsequent physical layer protocol data units comprises a plurality of modulation type identifier values, wherein at least a portion of said plurality of modulation type identifier values is based on at least a portion of one or both of said selected corresponding plurality of modulation type identifiers and/or said selected one or more coding rate identifiers.

16. The system according to claim 15, wherein said receiver is operable to receive said received one or more subsequent physical layer protocol data units via one or more downlink RF channels.

17. The system according to claim 15, wherein said receiver is operable to generate said received one or more subsequent physical layer protocol data units based on subsequent signals received via said plurality of spatial streams.

18. The system according to claim 17, wherein said receiver is operable to generate said received one or more subsequent physical layer protocol data units by decoding said received subsequent signals based on at least a portion of said plurality of modulation type identifier values.

19. The system according to claim 15, wherein said receiver is operable to determine an adaptive modulation indication for receiving said received one or more subsequent physical layer protocol data units based on a comparison of said plurality of modulation type identifier values.

20. The system according to claim 15, wherein said header portion of said received one or more subsequent physical layer protocol data units comprise a closed loop indicator field.

21. The system according to claim 20, wherein said receiver is operable to determine a beamforming indication for receiving said received one or more subsequent physical layer protocol data units based on a value for said closed looped indicator field.

22. A system for communicating information, the system comprising:
a transmitter, for use in a MIMO communications system, said transmitter is operable to generate a physical layer protocol data unit (PPDU);
said transmitter is operable to configure a value for a closed loop indicator field, wherein a header portion of said generated physical layer protocol data unit comprises said closed loop indicator field; and
said transmitter is operable to transmit said generated physical layer protocol data unit via a plurality of spatial streams, utilizing beamforming, based on said configured value for said closed loop indicator field.

23. The system according to claim 22, wherein said header portion comprises a plurality of modulation type identifier fields.

24. The system according to claim 23, wherein said transmitter is operable to configure a corresponding value for each of said plurality of modulation type identifier fields, wherein said plurality of modulation type identifier fields correspond to said plurality of spatial streams.

25. The system according to claim 24, wherein said transmitter is operable to encode at least a portion of said generated physical layer protocol data unit for said transmitting via a corresponding one of said plurality of spatial streams based on said corresponding value for said corresponding one of said plurality of spatial streams.

26. The system according to claim 24, wherein each said configured corresponding value is equal based on said configured value for said closed loop indicator field.

27. The system according to claim 22, wherein said transmitter is operable to transmit a beamforming indication for receiving said transmitted physical layer protocol data unit based on said configured value for said closed loop indicator field.

28. The system according to claim 22, wherein said transmitter is operable to determine said configured value for said closed loop indicator field based on one or more received physical layer protocol data units.

* * * * *